(12) United States Patent
Bucur et al.

(10) Patent No.: US 6,949,912 B2
(45) Date of Patent: *Sep. 27, 2005

(54) ENABLING CIRCUIT FOR AVOIDING NEGATIVE VOLTAGE TRANSIENTS

(75) Inventors: Constantin Bucur, Santa Clara, CA (US); Marian Niculae, San Jose, CA (US)

(73) Assignee: O2Micro International Limited, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 10/757,870

(22) Filed: Jan. 15, 2004

(65) Prior Publication Data

US 2004/0207378 A1 Oct. 21, 2004

Related U.S. Application Data

(63) Continuation-in-part of application No. 10/176,641, filed on Jun. 20, 2002, now Pat. No. 6,756,769.

(51) Int. Cl.[7] .............................................. H01M 10/46
(52) U.S. Cl. ........................ 320/134; 320/166; 320/132
(58) Field of Search ................................ 320/134, 166, 320/132; 323/222

(56) References Cited

U.S. PATENT DOCUMENTS

| | | | |
|---|---|---|---|
| 4,476,425 A | 10/1984 | Chernotsky et al. | 320/39 |
| 4,535,399 A | 8/1985 | Szepesi | 363/20 |
| 4,541,041 A | 9/1985 | Park et al. | 363/41 |
| 4,586,119 A | 4/1986 | Sutton | 363/17 |
| 4,621,313 A | 11/1986 | Kiteley | 363/49 |
| 4,672,258 A | 6/1987 | Park et al | 363/98 |
| 4,727,469 A | 2/1988 | Kammiller | 363/56 |
| 4,748,550 A | 5/1988 | Okado | 363/98 |
| 4,794,506 A | 12/1988 | Hino et al. | 363/17 |
| 4,814,962 A | 3/1989 | Magalhaes et al. | 363/16 |
| 4,833,584 A | 5/1989 | Divan | 363/37 |
| 4,849,682 A | 7/1989 | Bauer et al. | 320/15 |
| 4,855,888 A | 8/1989 | Henze et al. | 363/132 |
| 4,860,189 A | 8/1989 | Hitchcock | 363/132 |
| 4,864,483 A | 9/1989 | Divan | 363/37 |

(Continued)

OTHER PUBLICATIONS

"An Introduction to the Principles and Features of Resonant Power Conversion", Steve Freeland, form Recent Developments in Resonant Power Conversion, Intertec Communications, Inc., 1988, pp. 20–43.

"Zero–Voltage Switching Technique in DC/DC Converters", Kwang–Hwo Liu and Fred C. Lee, from Recent Developments in Resonant Power Conversion, Intertec Communications, Inc., 1988, pp. 211–223.

"A New and Improved Control Technique Greatly Simplifies the Design of ZVS Resonant Inverters and DC/DC Power Supplies", Mehmet K. Nalbant, 1995 IEEE, pp. 649–701.

(Continued)

Primary Examiner—Bao Q. Vu
(74) Attorney, Agent, or Firm—Grossman, Tucker, Perreault & Pfleger PLLC (57) ABSTRACT

An enabling circuit including a comparison circuit, a switching circuit, and an output decision circuit. The comparison circuit compares a first comparison signal representative of a charge on a capacitor of a DC to DC converter with a second comparison signal representative of a reference charge and provides a comparison output signal in response to the comparison. In response to the comparison output signal, the switching circuit provides a first switching signal in a first state if the charge on the capacitor is less than said reference charge. Finally, the output decision circuit accepts at least the first switching signal and provides an enabling signal to enable the DC to DC converter to be controlled by a control signal in response to the first switching signal in the first state.

13 Claims, 3 Drawing Sheets

U.S. PATENT DOCUMENTS

| | | | |
|---|---|---|---|
| 4,912,622 A | 3/1990 | Steigerwald et al. | 363/98 |
| 4,935,857 A | 6/1990 | Nguyen et al. | 363/17 |
| 4,952,849 A | 8/1990 | Fellows et al. | 315/307 |
| 4,953,068 A | 8/1990 | Henze | 363/17 |
| 4,992,919 A | 2/1991 | Lee et al. | 363/17 |
| 5,017,800 A | 5/1991 | Divan | 307/66 |
| 5,019,996 A | 5/1991 | Lee | 364/483 |
| 5,027,263 A | 6/1991 | Harada et al. | 363/16 |
| 5,027,264 A | 6/1991 | DeDoncker et al. | 363/16 |
| 5,105,127 A | 4/1992 | Lavaud et al. | 315/291 |
| 5,113,334 A | 5/1992 | Tuson et al. | 363/25 |
| 5,132,888 A | 7/1992 | Lo et al. | 363/17 |
| 5,132,889 A | 7/1992 | Hitchcock et al. | 363/17 |
| 5,157,592 A | 10/1992 | Walters | 363/17 |
| 5,198,969 A | 3/1993 | Redl et al. | 363/17 |
| 5,208,740 A | 5/1993 | Ehsani | 363/124 |
| 5,231,563 A | 7/1993 | Jitaru | 363/98 |
| 5,235,501 A | 8/1993 | Stuart et al. | 363/17 |
| 5,268,830 A | 12/1993 | Loftus, Jr. | 363/17 |
| 5,285,372 A | 2/1994 | Huynh et al. | 363/132 |
| 5,291,382 A | 3/1994 | Cohen | 363/16 |
| 5,305,191 A | 4/1994 | Loftus, Jr. | 363/17 |
| 5,355,073 A | 10/1994 | Nguyen | 320/15 |
| 5,363,020 A | 11/1994 | Chen et al. | 315/209 |
| 5,384,516 A | 1/1995 | Kawabata et al. | 315/160 |
| 5,402,329 A | 3/1995 | Wittenbreder, Jr. | 363/16 |
| 5,412,557 A | 5/1995 | Lauw | 363/37 |
| 5,418,703 A | 5/1995 | Hitchcock et al. | 363/17 |
| 5,420,779 A | 5/1995 | Payne | 363/56 |
| 5,422,546 A | 6/1995 | Nilssen | 315/219 |
| 5,430,632 A | 7/1995 | Meszlenyi | 363/17 |
| 5,430,641 A | 7/1995 | Kates | 363/133 |
| 5,448,155 A | 9/1995 | Jutras | 323/285 |
| 5,448,467 A | 9/1995 | Ferreira | 363/17 |
| 5,481,160 A | 1/1996 | Nilssen | 315/209 |
| 5,510,974 A | 4/1996 | Gu et al. | 363/134 |
| 5,514,921 A | 5/1996 | Hankui et al. | 307/125 |
| 5,546,300 A | 8/1996 | Lee et al. | 363/132 |
| 5,559,688 A | 9/1996 | Pringle | 363/89 |
| 5,615,093 A | 3/1997 | Nalbant | 363/25 |
| 5,619,402 A | 4/1997 | Liu | 363/20 |
| 5,638,260 A | 6/1997 | Bees | 363/17 |
| 5,646,836 A | 7/1997 | Sadarnac et al. | 363/98 |
| 5,669,238 A | 9/1997 | Devers | 62/657 |
| 5,684,683 A | 11/1997 | Divan et al. | 33/65 |
| 5,694,007 A | 12/1997 | Chen | 315/247 |
| 5,712,533 A | 1/1998 | Corti | 315/169 |
| 5,715,155 A | 2/1998 | Shahani et al. | 363/132 |
| 5,719,474 A | 2/1998 | Vitello | 315/307 |
| 5,723,970 A | 3/1998 | Bell | 320/140 |
| 5,731,652 A | 3/1998 | Shimada | 310/316 |
| 5,734,261 A | 3/1998 | Knudsen | 323/908 |
| 5,736,842 A | 4/1998 | Jovanovic | 323/222 |
| 5,742,495 A | 4/1998 | Barone | 363/65 |
| 5,742,496 A | 4/1998 | Tsutsumi | 363/95 |
| 5,744,915 A | 4/1998 | Nilssen | 315/209 |
| 5,748,457 A | 5/1998 | Poon et al. | 363/16 |
| 5,764,494 A | 6/1998 | Schutten et al. | 363/17 |
| 5,774,346 A | 6/1998 | Poon et al. | 363/17 |
| 5,781,418 A | 7/1998 | Chang et al. | 363/16 |
| 5,781,419 A | 7/1998 | Kutkut et al. | 363/17 |
| 5,784,266 A | 7/1998 | Chen | 363/16 |
| 5,796,598 A | 8/1998 | Nowak et al. | 363/37 |
| 5,818,172 A | 10/1998 | Lee | 315/86 |
| 5,834,889 A | 11/1998 | Ge | 313/493 |
| 5,844,540 A | 12/1998 | Terasaki | 345/102 |
| 5,854,617 A | 12/1998 | Lee et al. | 345/102 |
| 5,856,916 A | 1/1999 | Bonnet | 363/20 |
| 5,875,103 A | 2/1999 | Bhagwat et al. | 363/17 |
| 5,880,940 A | 3/1999 | Poon | 363/20 |
| 5,886,477 A | 3/1999 | Honbo et al. | 315/209 |
| 5,886,884 A | 3/1999 | Baek et al. | 363/48 |
| 5,894,412 A | 4/1999 | Faulk | 363/56 |
| 5,910,709 A | 6/1999 | Stevanovic et al. | 315/225 |
| 5,917,722 A | 6/1999 | Singh | 363/132 |
| 5,920,475 A | 7/1999 | Boylan et al. | 363/127 |
| 5,923,129 A | 7/1999 | Henry | 315/307 |
| 5,930,121 A | 7/1999 | Henry | 363/16 |
| 5,932,976 A | 8/1999 | Maheshwari et al. | 315/291 |
| 5,939,830 A | 8/1999 | Praiswater | 315/DIG. 5 |
| 5,946,200 A | 8/1999 | Kim et al. | 363/17 |
| 5,998,974 A | 12/1999 | Sudo et al. | 320/136 |
| 6,011,360 A | 1/2000 | Gradzki et al. | 315/244 |
| 6,114,814 A | 9/2000 | Shannon et al. | 315/219 |
| 6,127,815 A | 10/2000 | Wilcox | 323/282 |
| 6,184,660 B1 | 2/2001 | Hatular | 320/141 |
| 6,316,881 B1 | 11/2001 | Shannon et al. | 315/219 |
| 6,330,169 B2 | 12/2001 | Mullett et al. | 363/16 |
| 6,366,066 B1 | 4/2002 | Wilcox | 323/282 |
| 6,396,722 B2 | 5/2002 | Lin | 363/98 |
| 6,459,595 B2 | 10/2002 | Assow | 363/21 |
| 6,580,258 B2 | 6/2003 | Wilcox et al. | 323/282 |

OTHER PUBLICATIONS

Switching Power Supply Design, Abraham I. Pressman, McGraw–Hill, 1991, pp. 93–104; 471–492.

"Phase Shifted Zero Voltage Transition Design Considerations and the UC3875 PWM Controller", by Bill Andreycak, Unitrode, Application Note, May 1997, pp. 1–14.

"Fixed–Frequency, Resonant–Switched Pulse Width Modulation with Phase–Shifted Control", by Bob Mammano and Jeff Putsch, from Power Supply Design Seminar, Unitrode, 1991, pp. 5–1 to 5–7.

"Zero Voltage Switching Resonant Power Conversion", by Bill Andreycak, from Power Supply Design Seminar, Unitrode, 1991, pp. A2–1 to A2–24; and A2–1A to A2–3A.

"Resonant Made Converter Topologies", by Bob Mammano, form Power Supply Design Seminar, Unitrode, 1991, pp. P3–1 to P3–12.

"The New UC3879 Phase–Shifted PWM Controller Simplifies the Design of Zero Voltage Transition Full–Bridge Converters", by Laszio Balogh, Unitrode, Application Note, 1995, pp. 1–8.

"A Comparative Study of a Class of Full Bridge Zero–Voltage–Switched PWM Converters", by W. Chen et al., 1995 IEEE, pp. 893–899.

"Optimum ZVS Full–Bridge DC/DC Converter with PWM Phase–Shift Control: Analysis, Design Considerations, and Experimental Results", by Richard Red I et al., 1994 IEEE, pp. 156–165.

"A Frequency/PWM Controlled Converter with Two Independently Regulated Outputs", by R.A. Fisher et al., HFPC, May 1989, pp. 459–471.

"Feasible Characteristic Evaluations of Resonant Tank PWM Inverter–Linked DC–DC High–Power Converters for Medical–Use High–Voltage Application", by H. Takano et al., 1995 IEEE, pp. 913–919.

"High Density Power–Hybrid Design of a Half–Bridge Multi–Resonant Converter", by Richard Farrington, et al., HFPC–Virginia Polytechnic Institute, May 1990, pp. 26–33.

"Small–Signal Analysis of the Zero–Voltage Switched Full–Bridge PWM Converter", by V. Vlatkovic et al., HFPC–Virginia Polytechnic Institute, May 1990, pp. 262–272.

International Search Report and the Written Opinion of the International Searching Authority dated Mar. 1, 2005.

ENABLING CIRCUIT FOR AVOIDING NEGATIVE VOLTAGE TRANSIENTS

CROSS REFERENCE TO RELATED APPLICATIONS

This application is a continuation-in-part application of U.S. Nonprovisional application Ser. No. 10/176,141 filed Jun. 20, 2002 now U.S. Pat. No. 6,756,769, all the teachings of which are incorporated herein by reference.

FIELD OF THE INVENTION

This invention relates to an enabling circuit for avoiding negative voltage transients from an associated regulating circuit, and more particularly to such an enabling circuit for enabling a synchronous rectifier converter to switch from a first state to second state if the charge on an energy storage element of the synchronous rectifier converter is less than a reference charge.

BACKGROUND OF THE INVENTION

A variety of circuits have energy storage element such as capacitors, inductors, and transformers that transfer energy from an input to an output of such circuits. If such energy storage elements are not properly discharged in some instances, unwanted power disturbances, e.g., negative voltage transients, may occur in the output signal causing damage to nearby sensitive components.

For instance, such a regulating circuit may be a DC-DC converter. DC-DC converters generally accept a DC input at one voltage level and convert it to a DC output at a higher or lower voltage level. Such DC-DC converters may be used in a wide variety of electronic devices in conjunction with a variety of systems. One such system may be used to provide a battery charging function for portable electronic devices such as laptop computers, cell phones, pagers, personal digital assistants, and the like.

One type of DC-DC converter is a synchronous rectifier converter (SRC). An SRC does not use any Schottky diodes, but rather uses transistors referred to as "synchronous rectifiers". Such transistors may be a variety of transistors such as MOS or MOSFET transistors. An SRC may also have a variety of internal components that typically include an energy storage element, e.g., a capacitor, inductor, or transformer, with one or more transistors controlled by various control techniques, e.g., pulse width modulation where the switch frequency is constant and the duty cycle varies with the load.

When an SRC is used in conjunction with a battery power management system, the SRC may accept an input voltage from a number of different power sources and convert it to an appropriate output voltage to, among other things, provide an appropriate charging current to an associated rechargeable battery. In such a battery power management system, there is typically an associated controller used to control the battery charging process. Such controller may be an integrated circuit (IC) having a plurality of input terminals or pins, some of which are connected to the output of the SRC. For instance, two such terminals may be coupled to either side of a sense resistor. The sense resistor may be in series with the output of the SRC such that it provides a signal representative of the charging current provided at the output of the SRC.

If a soft start occurs when the energy storage element, e.g., a capacitor, of the SRC is charged at a significant value, e.g., over several volts, negative voltage transients may appear on either terminal of the sense resistor potentially causing catastrophic failure of the associated controller IC. Accordingly, there is a need for an enabling circuit and method that overcomes the above deficiencies in the prior art and is capable of avoiding negative voltage transients from an associated regulating circuit by enabling the regulating circuit only when the charge on the energy storage element is below a reference charge.

BRIEF DESCRIPTION OF THE DRAWINGS

For a better understanding of the present invention, together with other objects, features and advantages, reference should be made to the following detailed description which should be read in conjunction with the following figures wherein like numerals represent like parts.

DETAILED DESCRIPTION

Figure 1:
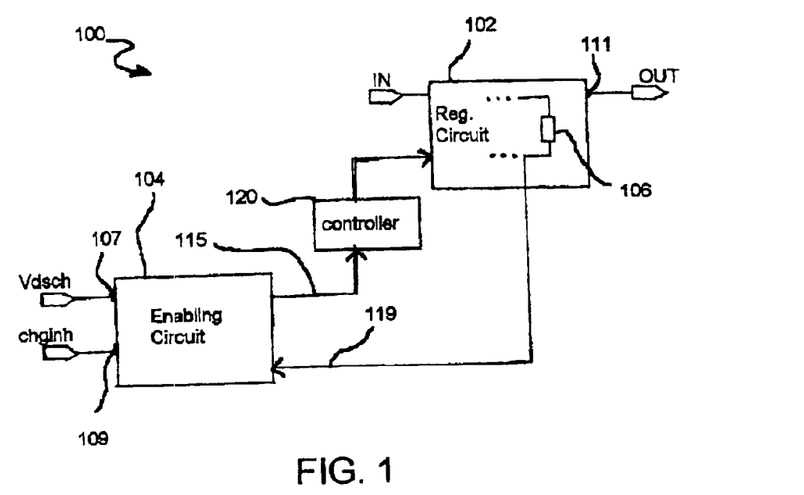
FIG. 1 is a block diagram of a system including an enabling circuit consistent with the present invention for enabling an associated regulating circuit to switch from a first state to a second state.

Turning to FIG. 1, an exemplary system 100 including an enabling circuit 104 and an associated regulating circuit 102 is illustrated. The regulating circuit 102 may be any variety of circuits, e.g., a synchronous rectifier converter, containing an energy storage element 106, e.g., a capacitor. In general, the enabling circuit 104 monitors the charge on the energy storage element 106 and enables the regulating circuit 102 to switch from a first state to a second state when the charge on the energy storage element is below a reference charge. The first state may be any variety of states such as a power off state, and the second state may also be any variety of states such as an operating state where the regulating circuit 102 is controlled by a particular control technique. The reference charge should be chosen based on the particular system and sensitivity of associated components. In one embodiment, the reference charge may be 3.0 volts.

The enabling circuit 104 has one input terminal 107 configured to accept a signal, Vdsch, representative of an acceptable reference charge level for the energy storage element 106. The enabling circuit 104 may have another input terminal 109 configured to accept a logic control signal chginh. Such logic control signal, chginh, has a predetermined state, e.g., low state, when at least one non energy storage element condition related to operation of the regulating circuit 102 is satisfied. Such a condition or conditions may be any variety of other conditions known to those skilled in the art unrelated to the charge on the energy storage element 106. For instance, one condition may be the proper coupling of an input power source at a proper power level to the input of the regulating circuit 102.

The enabling circuit 104 accepts a feedback signal from the regulating circuit 102 along path 119. Such feedback signal is representative of the charge on the energy storage element 106. The enabling circuit compares the charge on energy storage element 106 with a reference charge and may output an enabling signal if the charge level is less than the reference charge level. The enabling circuit 104 may also include various discharging means as further described in reference to FIG. 2 in order to discharge the energy storage element 106 below the reference charge level should the charge be greater than the reference charge level.

In one embodiment, once the charge on the energy storage element 106 is below the reference charge, the enabling circuit 104 sends an enabling signal along path 115 to the controller 120. The controller 120 is responsive to the enabling signal to then enable the regulating circuit to switch from a first state, e.g., a non-operating state or a predetermined suitable operating state, to a second state, e.g., another operating state. As such, an enabling circuit 104 consistent with the invention may advantageously delay operation of the regulating circuit 102 in the second state while maintaining operation of the regulating circuit 102 in the first state until the energy storage element 106 is discharged below a reference charge.

In another embodiment, the enabling circuit 104 may not send an enabling signal to the controller 120 until both the energy storage element 106 is discharged below the reference charge level and a logic control signal, e.g., signal chginh, input to the enabling circuit is at a predetermined state. Such predetermined state is representative of at least one satisfactory non energy storage element condition. Such predetermined state may also be representative of a satisfactory condition for all other non energy storage element conditions. In this case, an enabling circuit 104 consistent with the invention delays switching the regulating circuit 102 to operation in the second state while maintaining operation of the regulating circuit 102 in the first state, e.g., a non-operating state or a predetermined suitable operating state, until the energy storage element 106 is discharged below a predetermined charge level and a signal representing at least one satisfactory non energy storage element condition related to operation of the regulating circuit is satisfied.

Figure 2:
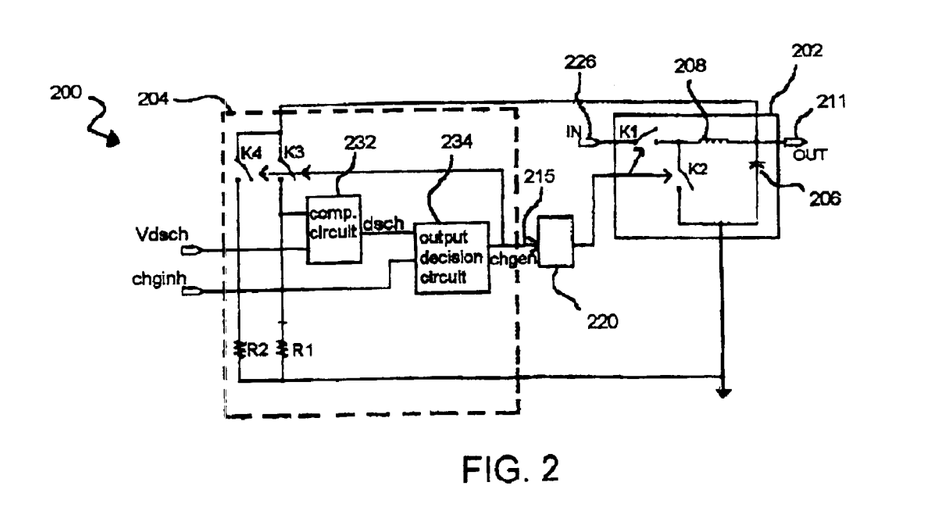
FIG. 2 is a block diagram of an exemplary enabling circuit consistent with the invention for enabling an associated synchronous rectifier converter to switch from one state to another state.

Turning to FIG. 2, one exemplary system 200 having an enabling circuit 204 consistent with the invention and a synchronous rectifier converter (SRC) 202 is illustrated. The SRC accepts an input voltage signal at input terminal 226 and provides an output voltage signal at output terminal 211. The SRC may include an inductor 208, a capacitor 206 and switches K1, K2. Switches K1, K2 may be any type of transistors and for simplicity are drawn to represent MOS type transistors. Such switches K1, K2 may be controlled by a variety of control techniques such as pulse width modulation (PWM) where the switch frequency is constant and the duty cycle varies with load, pulse-frequency modulation, or current-limited pulse-frequency modulation as those control techniques are known to those skilled in the art.

The enabling circuit 204 may include a comparator circuit 232, an output decision circuit 234, and discharge path including resistors R1, R2 and switches K3, K4. The comparator circuit 232 may be any variety of circuits for comparing the charge on the capacitor 206 to a predetermined reference value charge represented by control signal Vdsch input to the comparator circuit. The comparator circuit 232 is configured to provide an output signal to maintain the SRC 202 in the first state, e.g., a non-operating state or a predetermined suitable operating state, if the charge on the capacitor 206 is higher than the reference charge. The comparator circuit 232 is also configured to provide output signal to switch the SRC 202 from the first state to a second state, e.g., another operating state where switches K1, K2 are under control of the controller 220, if the charge on the capacitor 206 is less than the reference charge.

The output decision circuit 234 may be any variety of circuits for performing a desired logic function. The output decision circuit 234 accepts the output signal dsch from the comparator circuit 232 and may further accept a logic signal chginh from a separate source. The output decision circuit 234 may be configured to output an enabling signal on path 215 to the controller 220 if signal dsch indicates the charge on the capacitor 206 is less than a reference charge level. The output decision circuit 234 may alternately require signal dsch to indicate the charge on the capacitor 206 is less than a reference charge level, and require signal chginh to be in a predetermined state, e.g., low state, when at least one non energy storage-element condition is satisfied. The output decision circuit 234 is not a necessary part of the enabling circuit 204 if the logic signal chginh is not input to the enabling circuit. In this case, the comparator circuit 232 would provide the enabling signal if the charge on the capacitor 206 is less than the reference charge.

The enabling circuit 204 may also include a discharge path including resistors R1, R2, and switches K3, K4 to discharge the capacitor 206 below a reference level. Switches K3, K4 may be any type of transistors and for simplicity are drawn to represent MOS type transistors. Detailed operation of an enabling circuit and the discharge path is made later with reference to the exemplary enabling circuit of FIG. 2A.

Figure 2A:
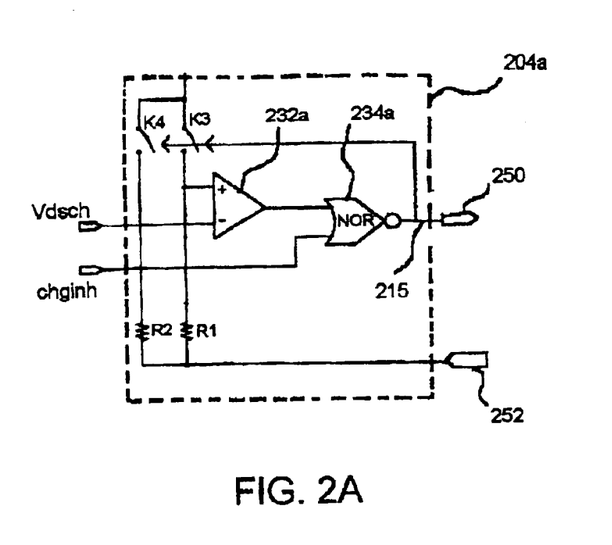
FIG. 2A is a circuit diagram illustrating an exemplary embodiment of the enabling circuit of FIG. 2.

Turning to FIG. 2A, a circuit diagram of one exemplary enabling circuit 204a is illustrated. Those skilled in the art will recognize a variety of circuit configurations which may be utilized in an enabling circuit consistent with the present invention. In the exemplary embodiment of FIG. 2A, the comparator circuit 232 of FIG. 2 includes a comparator 232a having its positive input terminal accepting the input signal representative of the charge on the capacitor 206 and its negative input terminal accepting the other input control signal, Vdsch, representative of a reference value charge.

The output decision circuit 234 includes a NOR gate 234a. The NOR gate 234a accepts the output from the comparator 232a and the control signal chginh. The output of the NOR gate 234a is HIGH only if all inputs are LOW. Otherwise, the output of the NOR gate 234a is LOW. In this embodiment, the enabling signal sent by the enabling circuit 204 to the controller 220 to enable the regulating circuit 202 to switch from the first state, e.g. switches K1, K2 open, to the second state state, e.g., switches K1, K2 under control of controller 220, is sent when the output of the NOR gate is HIGH.

Operation of the exemplary enabling circuit 204a in conjunction with the system 200 is described further herein with reference to the Truth Table of Table 1. Table 1 details the status of the various control signals and switches relative to each other with the output decision circuit 234 functioning as the NOR gate 234a of FIG. 2A. The status of control signal chginh input to the enabling circuit 204, control signal dsch output from comparator 232a, control signal chgen output from the NOR gate 234a, switches K1, K2 of the SRC 202, and switches K3, K4 of the enabling circuit 204 are all detailed in Table 1.

TABLE 1

| chginh | H   | H   | L   | L   |
|--------|-----|-----|-----|-----|
| dsch   | H   | L   | H   | L   |
| chgen  | L   | L   | L   | H   |
| K1     | OFF | OFF | OFF | PWM |
| K2     | OFF | OFF | OFF | PWM |
| K3     | ON  | ON  | ON  | OFF |
| K4     | ON  | ON  | ON  | OFF |

As illustrated and described more fully herein, the exemplary enabling circuit 204a advantageously does not enable switches K1, K2 of the SRC 204 to be controlled by the proper control technique, e.g., PWM control, and maintains switches K1, K2 in an OFF position, until the capacitor 206 of the SRC 202 is discharged below a reference charge (control signal dsch is L), and at least one other non capacitor charge related condition for operation of the regulating circuit (control signal chginh is L) is satisfied. As such, negative voltage transients that may otherwise occur at the output terminal 211 of the SRC 202 are avoided.

As illustrated in the first substraitve column of Table 1, if the charge level on capacitor 206 is greater than reference charge level as represented by control signal Vdsh input to the compartor 232a, then the control signal dsch output from the comparator 232a is HIGH. The output control signal dsch from the compartor 232a is the input to the Nor gate 234a.

The other input to the Nor gate 234a may be the control signal chginh from a separate source. Such control signal chginh is representative of at least one non capacitor related condition pertinent to operation of the SRC 202. In this embodiment, if this chginh signal is LOW, at least one and perhaps all other non capacitor related conditions pertinent yo operation of the SRC 202 are satisfactory. If this chginh signal is HIGH, such condition or conditions are unsatisfactory. Accordingly, if the output control signal dsch from the comparator 232a is HIGH and the chginh signal is also HIGH, the output signal from the NOR gate 234a is LOW. Thus, switches K1 and K2 remain OFF or open and the operation of the SRC 202 is displayed. As such, if the SRC is operating to provide a charging current to an associated rechargeable battery, such charging current would not be provided in this instance, nor would current flow from the capacitor 206 through the inductor 208 be possible in this instance.

Turning to the second substantive column of Table 1, if the capacitor 206 is discharged below the reference charge represented by control signal Vdsch, the output control signal dsch from the comparator 232a goes LOW indicating the charge level on the capacitor 206 is acceptable. However, if another non capacitor charge related condition is unsatisfactory, the control signal chginh remains HIGH. As such, the output of the NOR gate 234a remains LOW and the operation of the SRG 202 is still delayed.

Turning to the third substantive column of Table 1, if the control signal chginh is LOW representing a satisfactory starting condition for at least one non-charge related condition, but the output control signal dsch from the comparator 232a is HIGH, then the output signal chgen from the NOR gate 234a remains LOW. As such, the operation of the SRC 202 is still delayed.

As illustrated in the fourth substantive column of Table 1, it is not until the capacitor 206 is discharged below the reference charge level (control signal dsch output from the comparator 232a is LOW), and at least one if not all other non-charge related conditions for operation of the regulating circuit (control signal chginh is LOW) are satisfied, that the control signal chgen output of the NOR gate 234a is HIGH. Once the control signal chgen is HIGH, switches K3 and K4 of the enabling circuit 204 open or are in an OFF position. The HIGH control signal chgen enables the controller 220 to drive the SRC 202. Hence, switches K1, K2 are controlled by an appropriate control technique, e.g., PWM.

If the enabling signal is not present in this embodiment, switches K3, K4 are closed or in an ON position. A discharge path for the capacitor 206 is then created through the switches K3, K4. Switch K3 is further coupled in series to resistor R1, while switch K4 is further coupled in series to resistor R2. Resistor R1 has a resistive value that is higher than the resistive value for resistor R2. As such, when switches K3, K4 are closed because no enabling signal from the NOR gate 234a is present, a discharge path is created and resistor R2 serves to discharge the capacitor 206.

Figure 3:
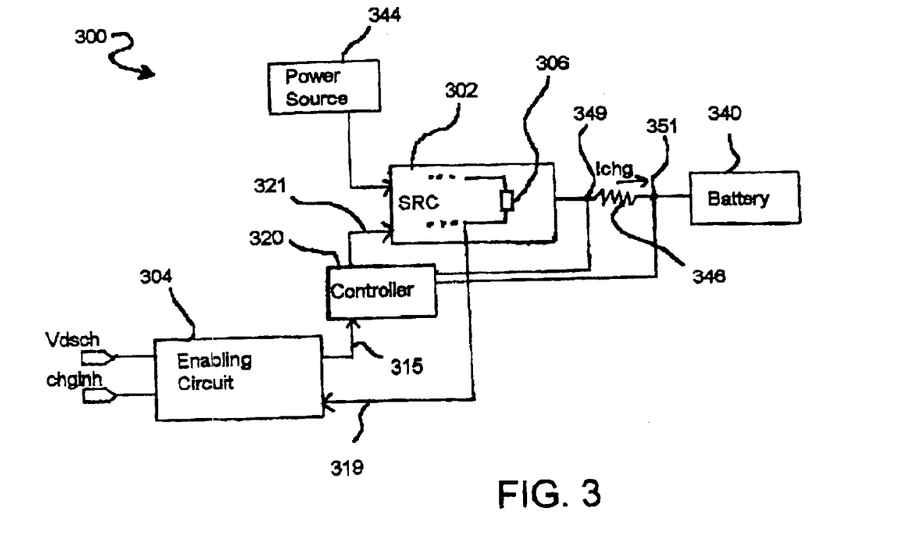
FIG. 3 is a block diagram of a battery management system utilizing the enabling circuit of FIG. 2.

Turning to FIG. 3, an exemplary battery charging system 300 generally including a power source 344, an SRC 302, an enabling circuit 304 consistent with the invention, a rechargeable battery 340, and a battery charging controller 320 is illustrated. Such a battery charging system 300 may be used in a variety of portable electronic devices such as laptop computers, cell phones, pagers, personal digital assistants, and the like to provide and control power flow to a rechargeable battery 340, e.g., a lithium, nickel-cadmium, or nickel-metal hydride battery.

A sensor such as sense resistor 346 may be used in order to provide a sensed signal to the controller 320 indicative of the charging current Ichg to the battery. Such a controller 320 is typically an integrated circuit (IC) and may be sensitive to negative voltage transients that may otherwise occur at either terminal 349, 351 if the energy storage element 306 is not properly discharged below a reference charge value. Such negative voltage transients may appear on either terminal 349, 351 due to oscillation induced by an inductor and capacitor group of the SRC 302.

Once a power source 344 is properly coupled to the system 300, it provides an input DC voltage signal to the SRC 302. The power source 344 may be an AC/DC adapter configured to receive conventional AC voltage from a power outlet and convert it to an applicable DC voltage, or a DC/DC adapter such as a "cigarette lighter" type adapter configured to plug into that type of socket, or other types of power sources.

Advantageously, the SRC 302 accepts power input from the power source 344 and converts it to a proper output voltage and current level for providing a charging current Ichg to the battery 340 only if the controller 320 receives an enabling signal from the enabling circuit 304 along path 315. Otherwise, the controller 320 delays providing a charging current Ichg to the battery 340, while keeping the SRC 302 in a predetermined suitable state. This predetermined suitable state may be any variety of states as determined by the position of various switches in the SRC 302. In the previous embodiment of FIG. 2, switches K1, K2 of SRC 202 were chosen to be in an open state. The SRC 302 is controlled by the controller 320 by any variety of control techniques, e.g., PWM, known by those skilled in the art.

Advantageously therefore, the enabling circuit 304 delays providing of the charging current Ichg to the battery 340 until the energy storage element 306 is discharged below a reference charge. The enabling circuit 304 may also further delay the charging current Ichg to the battery 340 until another control signal, e.g., signal chginh, from another source indicates that at least one non-charge related condition pertinent to operation of the SRC 302 is satisfactory.

Figure 4:
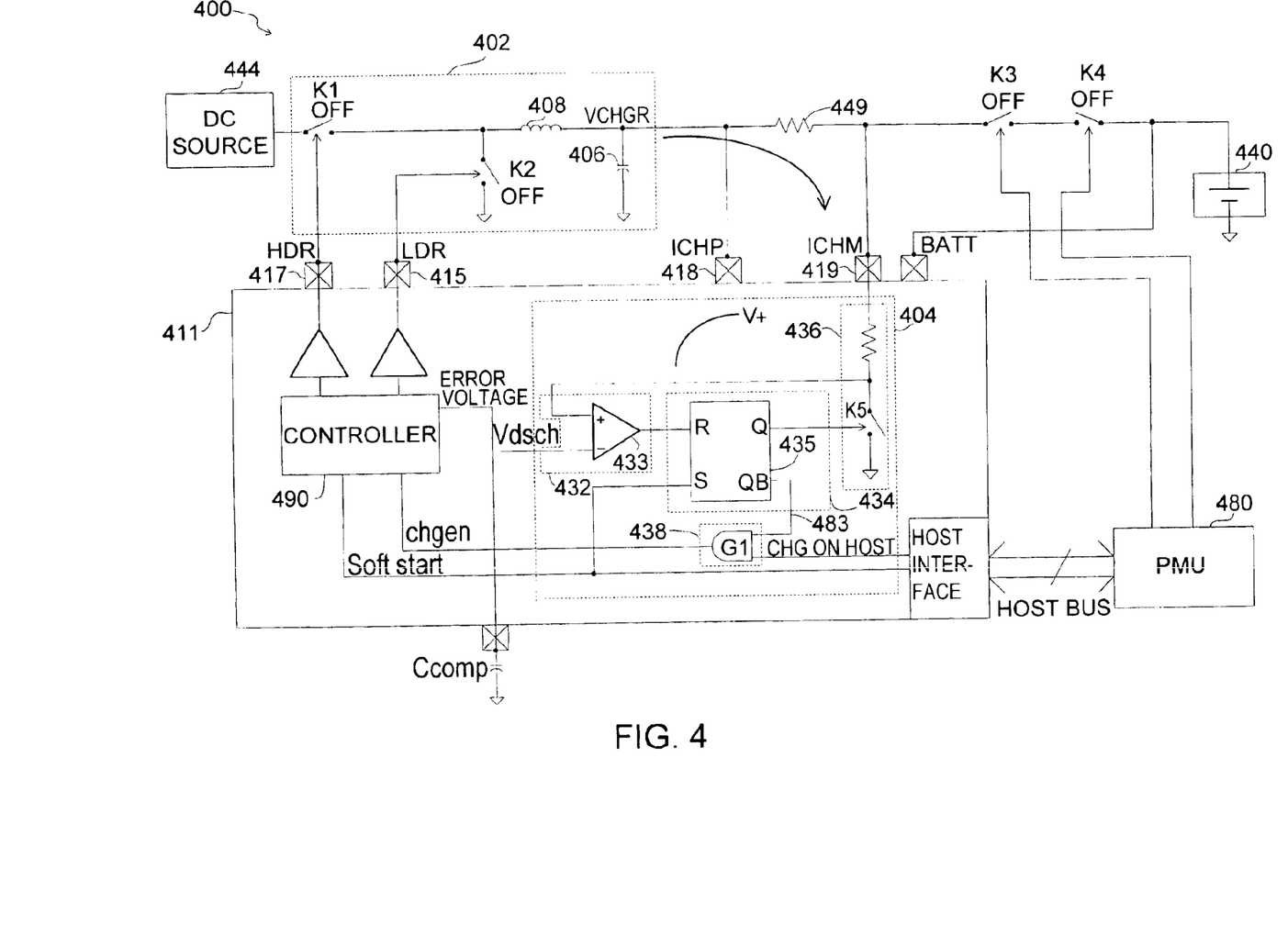
FIG. 4 is a block diagram of another embodiment of an exemplary enabling circuit in a battery charging system.

In another embodiment, FIG. 4 illustrates a battery charging system 400 generally including a DC power source 444 for providing power to recharge the rechargeable battery 440. Battery charging conditions may be controlled by the charging circuit 411 which regulates the output of the DC to DC converter 402. The charging circuit 411 may include an enabling circuit 404 consistent with another embodiment as further detailed herein.

The DC to DC converter 402 may be any variety of DC to DC converters controlled by any variety of control signals. The DC to DC converter 402 may be a synchronous rectifier converter having a high side switch K1, a low side switch K2, an inductor 408, and a capacitor 406 as is known in the art. A control signal from the charging circuit 411 may be output the low side terminal 415 and high side terminal 417 to the respective control terminals of the low side switch K1 and high side switch K2. In one instance, the switches K1, K2 may be any variety of transistors such as MOS transistors. The control signal may be a PWM signal where its duty cycle controls the duration of a "switch ON" state (high side switch K1 ON and low side switch K2 OFF) and "switch OFF" state (high side switch K1 OFF and low side switch K2 ON) and hence the output voltage and current level of the DC to DC converter 402.

If the charge on the capacitor 406 of the DC to DC converter 402 is above a reference value, the battery 440 is not electrically coupled to the output of the DC to DC converter 402 (switches K3 and K4 are OFF) and the charging circuit 411 instructs the DC to DC converter 402 to switch to a switch OFF state, and the capacitor 406 may discharge current via the inductor 408 and the closed switch K2 to ground. This may then cause undesirable power conditions on the terminals 418 and 419 of the charging circuit 411 that couple to either side of the sense resistor 449. For example, negative voltage transients and a negative current oscillation may be experienced at terminal 418 due to the parallel LC circuit (including inductor 408 and capacitor 406).

The charging circuit 411 may include another embodiment of an enabling circuit 404 that, like the other enabling circuit embodiments, prevents such undesirable power conditions on terminals 418, 419 in such instances. In general, during a soft start condition the enabling circuit 404 compares a charge on the capacitor 406 with a reference charge and does not enable the charging circuit 411 to control operation of the DC to DC converter 402 until the charge on the capacitor 406 is less than a reference charge. Therefore, the high side switch K1 and low side switch K2 of the DC to DC converter may remain OFF until an enabling signal from the enabling circuit 404 is received by the controller 490.

The enabling circuit 404 generally includes a comparison circuit 432, a switching circuit 434, a discharge path 436, and an output decision circuit 438. The comparator circuit 432 may include comparator 433. The comparator 433 may receive a first signal at its noninverting input terminal representative of a charge on the capacitor 406. The comparator may also receive a second signal at its inverting input terminal representative of a reference charge, represented by signal Vdsch. The comparator compares such signals and provides an output comparison signal to the switching circuit 434 in response to the comparison.

The switching circuit 434 may accept the output comparison signal from the comparison circuit 432 and a soft start signal, e.g., as may be provided by the host power management unit (PMU) 480. The switching circuit 434 may then provide a first output signal to the output decision circuit 438 along path 483 and a second output signal to switch K5 of the discharge path 436. The switch K5 may be any variety of transistors such a MOS transistor. The switching circuit 434 may include an RS flip flop 435. The set terminal of the flip flop 435 may accept the soft start signal while the reset terminal may accept the comparison output signal. The output QB terminal of the flip flop 435 may provide the first output signal to the output decision circuit 438 while the other output terminal Q may provide the second output signal to the switch K5 of the discharge path 436.

The output decision circuit 438 may include any variety circuits for performing a desired logic function. In one embodiment, the output decision circuit may include an AND gate G1. The output decision circuit 438 provides a charge enable signal, chgen, to the controller 490 of the charging circuit 411. If the charge enable signal is digital one, then the controller 490 is able to control the pair of switches K1, K2 of the DC to DC converter 402, e.g., via a PWM control signal. If the charge enable signal is a digital zero, the controller 490 inhibits control of the pair of switches K1, K2 and the pair of switches may remain OFF. The controller 490 may include any variety of components to provide the control signal, e.g., a PWM signal, to the switches. For example, the controller 490 may include a plurality of error amplifiers to compare input signals of monitored parameters (not shown) with associated maximum thresholds for each parameter. The plurality of error amplifiers may then be configured as an analog "wired-OR" topology such that the error amplifier that first detects a condition exceeding the associated maximum threshold controls the duty cycle of the PWM control signal.

In operation, the DC to DC converter 402 may initially be disabled having both switches K1 and K2 in an OFF state. In addition, both switches K3 and K4 may be OFF. Meanwhile, a digital one soft start signal may be received at the Set terminal of the flip flop 435 as requested by the PMU 480. The output Q of the flip flop 435 would then set to a digital one and the other output QB would be a digital zero. In response, the switch K5 of the discharge path 436 would close causing any charge on the capacitor 406 to be discharged via the path to ground created by the closed switch K5. In addition, since the QB output is a digital zero, the output of the AND gate G1 would also be a digital zero regardless of the CHG ON HOST signal from the PMU 480. The controller 490 may then be responsive to the digital zero signal from the AND gate G1 to inhibit control of the switches K1 and K2 and hence maintain the switches K1 and K2 in an OFF state.

The charge on the capacitor 406 continues to be discharged until it is discharged to a safe level below the reference charge level. Once the charge on the capacitor is less than the reference charge level, the output Q of the flip flop 434 would be a digital zero and the output QB of the flip flop 434 would be a digital one. Hence, the switch K5 of the discharge path would open. If the CHG ON HOST signal from the PMU 480 was also a digital one, then the output of the AND gate G1 (the enabling signal) would also be a digital one. In response, the controller 490 would then be able to control the state of the switches K1 and K2, e.g., via a PWM control signal. Advantageously, therefore if the controller 490 provided a PWM signal to place the switches K1 and K2 in a switch OFF state in such an instance, no adverse power conditions would be created at terminals 418, 419 since the charge on the capacitor 406 has been sufficiently reduced.

There is thus provided an enabling circuit for enabling a DC to DC converter having a capacitor coupled to an output terminal of the DC to DC converter to be controlled by a control signal. The enabling circuit may comprise a comparison circuit configured to compare a first comparison signal representative of a charge on the capacitor with a second comparison signal representative of a reference charge and provide a comparison output signal in response to the comparison. The enabling circuit may also comprise a switching circuit configured to accept the comparison output signal, and in response to at least the comparison output signal provide a first switching signal in a first state if the charge on the capacitor is less than the reference charge; and an output decision circuit configured to accept at least the first switching signal and provide an enabling signal to enable the DC to DC converter to be controlled by the control signal in response to the first switching signal in the first state.

There is also provided a battery charging system comprising a DC to DC converter configured to accept an input power level from a DC power source and provide a regulated output power level to a rechargeable battery. The DC to DC converter may have a capacitor coupled to an output terminal of the DC to DC converter. The battery charging system may also include an enabling circuit for enabling the DC to DC converter to be controlled by a control signal. The enabling circuit may comprise a comparison circuit configured to compare a first comparison signal representative of a charge on the capacitor with a second comparison signal representative of a reference charge and provide a comparison output signal in response to the comparison. The enabling circuit may also comprise a switching circuit configured to accept the comparison output signal, and in response to at least the comparison output signal provide a first switching signal in a first state if the charge on the capacitor is less than the reference charge; and an output decision circuit configured to accept at least the first switching signal and provide an enabling signal to enable the DC to DC converter to be controlled by the control signal in response to the first switching signal in the first state.

The embodiments that have been described herein, however, are but some of the several which utilize this invention and are set forth here by way of illustration but not of limitation. It is obvious that many other embodiments, which will be readily apparent to those skilled in the art, may be made without departing materially from the spirit and scope of the invention.

What is claimed is:

1. An enabling circuit for enabling a DC to DC converter, said DC to DC converter having a capacitor coupled to an output terminal of said DC to DC converter, said enabling circuit comprising:
a comparison circuit configured to compare a first comparison signal representative of a charge on said capacitor with a second comparison signal representative of a reference charge and provide a comparison output signal in response to said comparison;
a switching circuit configured to accept said comparison output signal, and in response to at least said comparison output signal provide a first switching signal in a first state if said charge on said capacitor is less than said reference charge; and
an output decision circuit configured to accept at least said first switching signal and provide an enabling signal to enable said DC to DC converter to be controlled by a control signal in response to said first switching signal in said first state.

2. The enabling circuit of claim 1, wherein said output decision circuit is further configured to accept a condition signal and wherein said output decision circuit provides said enabling signal if said first switching signal is in said first state and said condition signal is in a state representative of a desired charging state.

3. The enabling circuit of claim 2, wherein said output decision circuit comprises an AND gate, said AND gate accepting said first switching signal and said condition signal.

4. The enabling circuit of claim 1, wherein said switching circuit further provides a second switching signal in a first state if said charge on said capacitor is greater than said reference charge and in a second state if said charge on said capacitor is less than said reference charge, and wherein said enabling circuit further comprises a discharge path responsive to said second switching signal to discharge said capacitor if said second switching signal is in said first state.

5. The enabling circuit of claim 4, wherein said discharge path comprises a switch, said switch responsive to said second switching signal to close if said second switching signal is in said first state and to open if said second switching signal is in said second state.

6. The enabling circuit of claim 1, wherein said switching circuit comprises an RS flip flop.

7. A battery charging system comprising:
a DC to DC converter configured to accept an input power level from a DC power source and provide a regulated output power level to a rechargeable battery, said DC to DC converter having a capacitor coupled to an output terminal of said DC to DC converter; and
an enabling circuit for enabling said DC to DC converter to be controlled by a control signal, said enabling circuit comprising:
a comparison circuit configured to compare a first comparison signal representative of a charge on said capacitor with a second comparison signal representative of a reference charge and provide a comparison output signal in response to said comparison;
a switching circuit configured to accept said comparison output signal, and in response to at least said comparison output signal provide a first switching signal in a first state if said charge on said capacitor is less than said reference charge; and
an output decision circuit configured to accept at least said first switching signal and provide an enabling signal to enable said DC to DC converter to be controlled by said control signal in response to said first switching signal in said first state.

8. The system of claim 7, wherein said output decision circuit is further configured to accept a condition signal and wherein said output decision circuit provides said enabling signal if said first switching signal is in said first state and said condition signal is in a state representative of a desired charging state.

9. The system of claim 8, wherein said output decision circuit comprises an AND gate, said AND gate accepting said first switching signal and said condition signal.

10. The system of claim 7, wherein said switching circuit further provides a second switching signal in a first state if said charge on said capacitor is greater than said reference charge and in a second state if said charge on said capacitor is less than said reference charge, and wherein said enabling circuit further comprises a discharge path responsive to said second switching signal to discharge said capacitor if said second switching signal is in said first state.

11. The system of claim 10, wherein said discharge path comprises a switch, said switch responsive to said second switching signal to close if said second switching signal is in said first state and to open if said second switching signal is in said second state.

12. The system of claim 7, wherein said switching circuit comprises an RS flip flop.

13. The system of claim 7, wherein said control signal comprises a pulse width modulated (PWM) signal.

* * * * *